United States Patent [19]
Stedman

[11] 3,869,010
[45] Mar. 4, 1975

[54] CRAWLER TRACTOR
[75] Inventor: Robert N. Stedman, Chillicothe, Ill.
[73] Assignee: Caterpillar Tractor Co., Peoria, Ill.
[22] Filed: Sept. 11, 1972
[21] Appl. No.: 287,596

[52] U.S. Cl. .................................. 180/9.5, 180/49
[51] Int. Cl. ............................................ B62d 55/00
[58] Field of Search .......... 180/44, 49, 9.2, 9.4, 9.6, 180/9.5, 9.54

[56] References Cited
UNITED STATES PATENTS

| 949,354 | 2/1910 | Desy | 180/9.6 |
|---|---|---|---|
| 2,598,863 | 6/1952 | Tucker | 180/50 |
| 3,435,908 | 4/1969 | Sunderlin | 180/9.44 |
| 3,451,494 | 6/1969 | Kowalik | 180/9.44 X |
| 3,735,830 | 5/1973 | Talley | 180/9.5 |

Primary Examiner—Philip Goodman
Assistant Examiner—John A. Carroll
Attorney, Agent, or Firm—Phillips, Moore, Weissenberger, Lempio & Strabala

[57] ABSTRACT

A tractor has a frame which rides on four separate track assemblies. Each of the forward pair of these track assemblies is capable of a degree of upward and downward movement relative to the other and to the frame, so that contact between each of these track assemblies and the ground is maintained as the tractor is driven over relatively rough terrain. Ground forces acting on the forward track assemblies are substantially equalized between such forward track assemblies by equalizer bar apparatus.

4 Claims, 3 Drawing Figures

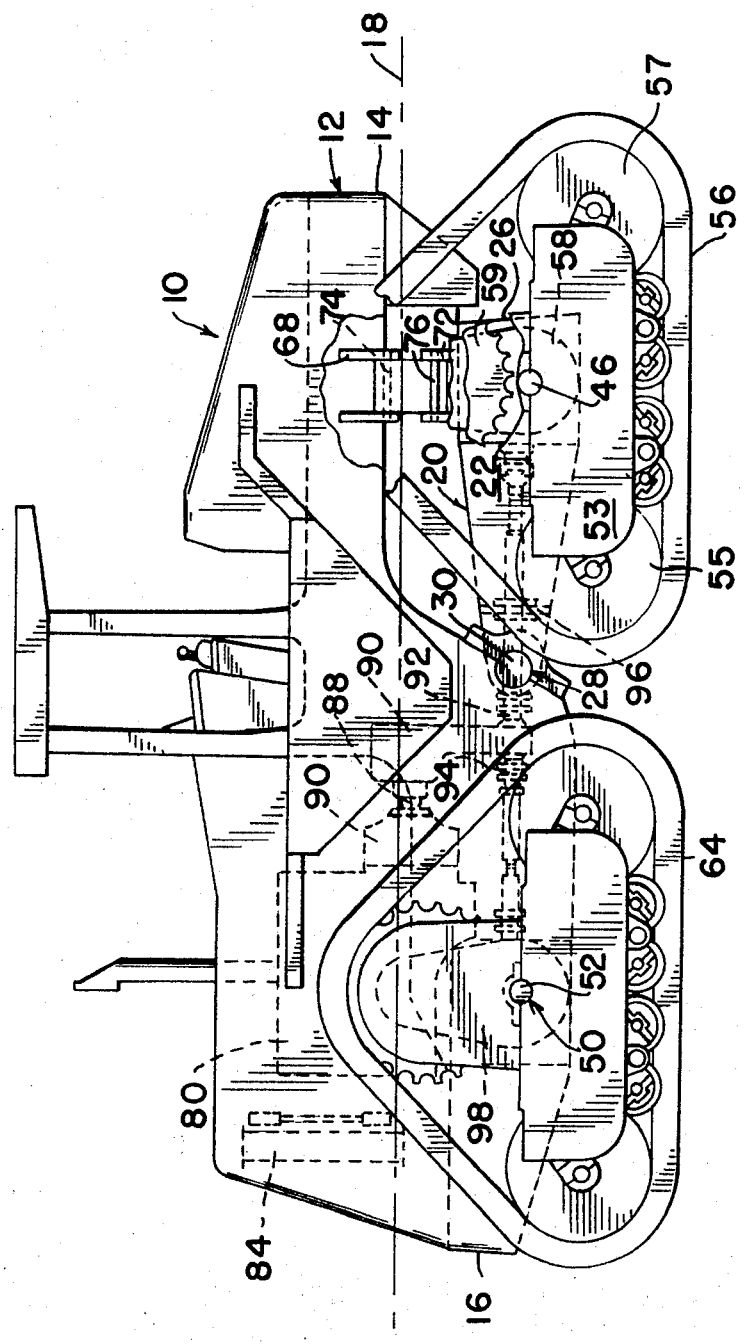

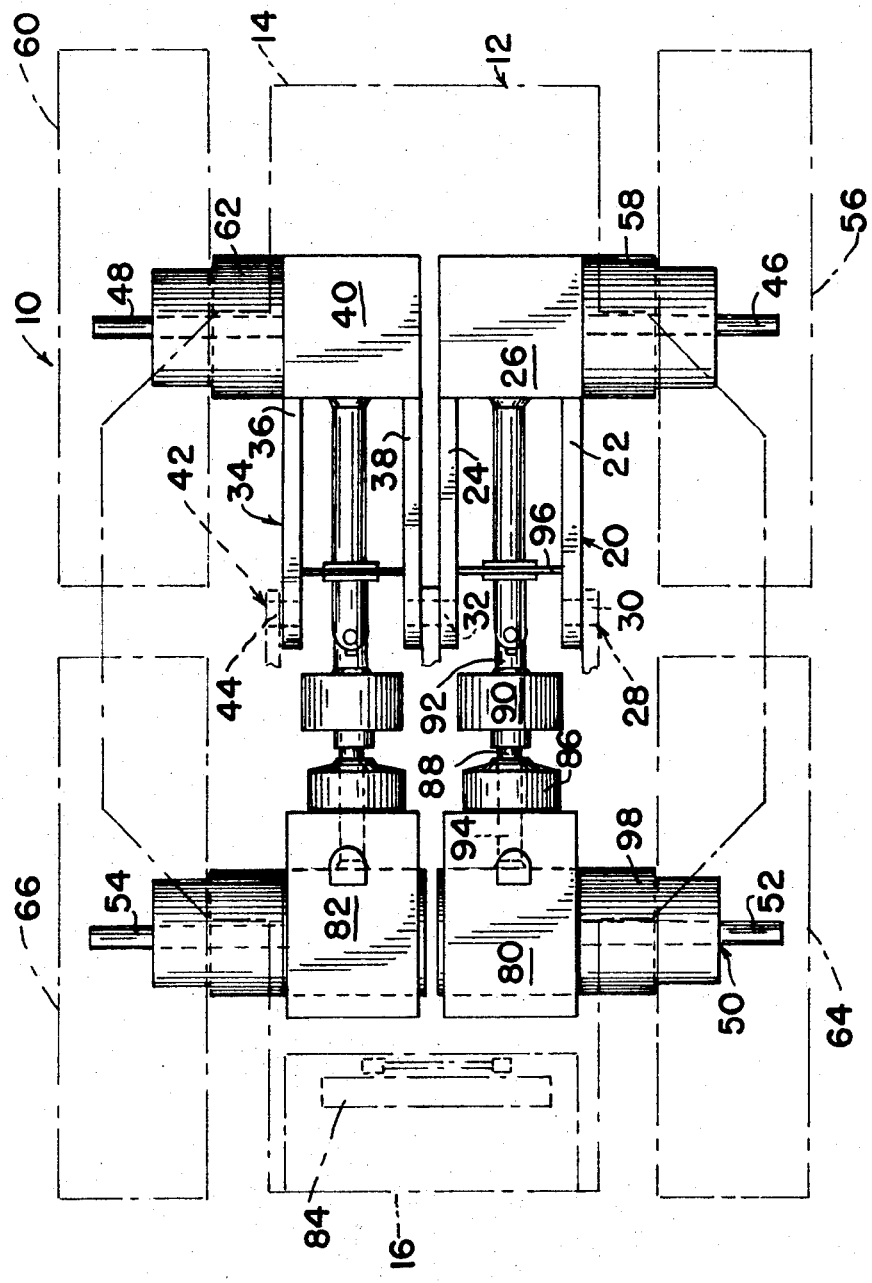

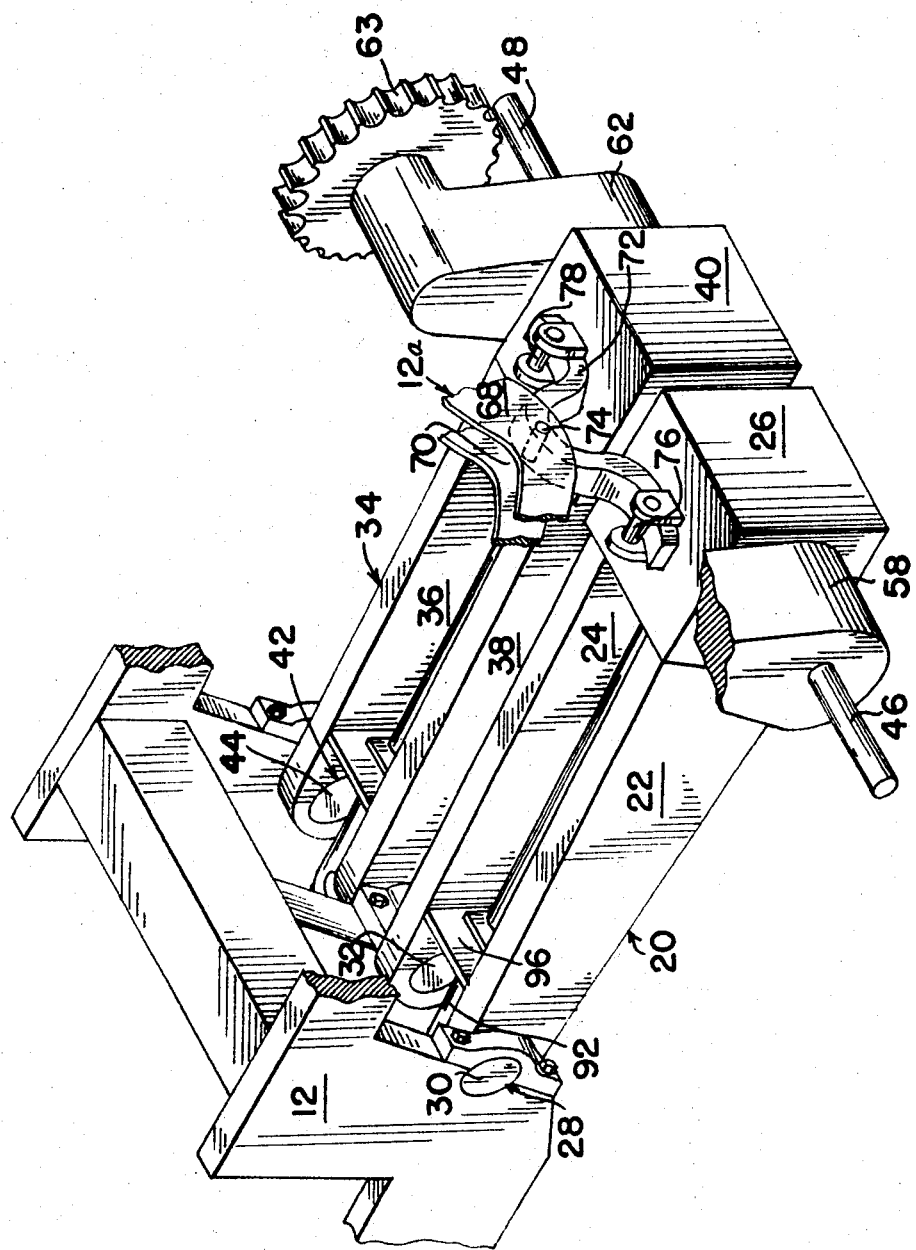

CRAWLER TRACTOR

BACKGROUND OF THE INVENTION

This invention relates to powered vehicles, and more particularly, to a four-track vehicle providing suspension movement of a pair of track assemblies and apparatus for equalizing loads between such pair of track assemblies.

Particular advantages offered by an articulated four-track tractor are described in u.S. Pat. No. 3,435,908 to D.E. Sunderlin et al, assigned to the assignee of this application. However, the power available for certain operations in the use of such an articulated vehicle is limited, due to the hinged connection between the forward and rear members. For example, in applications such as bulldozing and ripping, a rigid frame vehicle offers certain control and power transmitting advantages over an articulated vehicle of the same weight and horsepower, since the axis of the rigid frame vehicle is normally aligned with respect to the applied loads incurred in various work applications. An additional limitation with respect to four-track articulated vehicles is the increased overall vehicle length required for maneuvering clearance between the front and rear units. This characteristic results in larger operating area requirements and less desirable vehicle length-to-width ratios. In contrast, a single rigid frame arrangement permits closer placement of the forward and rear tracks, providing a shorter, more maneuverable vehicle having a lower overall length-to-width ratio and improved stability.

Serious problems in the development of a successful four-track rigid frame tractor have arisen in the past. First, it has been found that if all four tracks are rigidly attached to the main frame, the vehicle has difficulty in negotiating rough terrain. Some relative movement, i.e., suspension yield, between the respective track assemblies must be provided to maintain contact between each track and the ground. Furthermore, achieving proper steering control and vehicle stability has proven difficult.

Normally, rigid frame tractors are steered by rotating the track on one side at a speed different from that of the other side, so that the vehicle turns in the direction of the slower turning track (i.e., "skid-steering"). In such turning there is, of course, a certain amount of lateral slippage of the track shoes over the ground surface. In the case of four-track skid-steering, the front pair of track assemblies, it has been found, slide together in one direction, and the rear pair of track assemblies slide together in the opposite direction.

Sunderlin et al teach a rear suspension system which allows some movement of the rear tracks about a pivot axis stationed above the ground. The use of such a suspension system in a rigid frame four-track skid-steer vehicle, however, has several serious drawbacks. Since, as pointed out above, the front or rear pair of tracks slide together in one direction, the resulting forces acting at ground level on either pair act in the same direction, creating a large moment about the pivot pin. Such a moment will tend to rock the vehicle up on one of a pair of tracks, and under extreme cases, to raise one of the tracks off the ground.

SUMMARY OF THE INVENTION

It is an object of this invention to provide a four-track rigid frame tractor which allows a degree of relative movement between the respective track assemblies.

It is a further object of this invention to provide a four-track rigid frame tractor which, while fulfilling the above object, overcomes the problem of lifting one of the tracks due to ground reaction forces in turning the vehicle.

It is a still further object of this invention to provide a four-track rigid frame tractor which, while fulfilling the above objects, provides means for equalizing the load carried by a pair of tracks between such tracks.

It is a still further object of this invention to provide a four-track rigid frame tractor which, while fulfilling the above objects, is simple in design and operates in an efficient manner.

The present invention is a powered crawler tractor comprising a rigid frame defining a pair of end portions. First and second axle members are disposed on either side of one end portion, and third and fourth axle members are disposed on either side of the other end portion. Further included are four endless track assemblies, one track assembly being mounted on each of said axle members. Means are included for allowing a degree of travel of the first and second axle members relative to each other and to the frame, in a back and forth path generally toward and away from the general plane of the frame. Means are included for driving each of said four track assemblies. Further included are means for providing that the load of the one end portion is carried substantially equally by the endless track assemblies mounted on the first and second axle members.

BRIEF DESCRIPTION OF THE DRAWINGS other objects of the invention will become apparent from the study of the following specification and drawings, in:

FIG. 1 is a side elevation, partially broken away, of the crawler tractor embodying the invention;

FIG. 2 is a plan view of the crawler tractor, showing the invention; and

FIG. 3 is a perspective view, with portions removed, of the arm members of the crawler tractor, and the structure associated therewith.

DESCRIPTION OF THE PREFERRED EMBODIMENT

Shown generally in FIGS. 1 and 2 is the preferred embodiment of the crawler tractor 10. Such tractor 10 has a rigid frame 12 having a forward portion 14 and a rearward portion 16, which together define a frame plane 18, as particularly shown in FIG. 1. An elongated arm member 20, made up of spaced bar members 22, 24 and casing 26, has one end thereof pivotally fixed to the frame 12 by means of pivot means 28 (FIG. 3). Such pivot means 28 in particular comprise pins 30, 32. Similarly, a second elongated arm member 34, made up of spaced bar members 36, 38 and casing 40, has one end thereof pivotally fixed to the frame 12 by means of pivot means 42. Such pivot means 42 for arm member 34 comprise pins 32, 44.

Pins 30, 32, 44 are positioned adjacent to each other substantially intermediate the forward and rearward portions 14, 16 of the frame 12, near to the center of gravity of the tractor 10. The pins 30, 32, 44 are positioned so that their axes are aligned, so as to define a single pivot axis for arm members 20, 34 which is disposed across the frame 12 from one side to the other. Such arm members 20, 34 extend generally toward the forward portion 14 of the frame 12.

The extended end of arm member 20 (i.e., casing 26), has fixed thereto and extending therefrom an axle member 46. Similarly, the extended end of arm member 34 has fixed thereto and extending therefrom an axle member 48. Axle members 46, 48 are disposed on either side of the forward portion 14. A fixed shaft 50 extends across and is fixed to the rearward portion 16 of the frame 12, and defines axle members 52, 54 disposed on either side of the rearward portion 16.

Mounted to the casing 26 is a final drive assembly 58 incorporating a drive sprocket 59. An endless track assembly 56 encompasses drive sprocket 59 and a roller frame 53 on which idler wheels 55, 57 are mounted. Roller frame 53 is pivotally mounted on axle member 46 so that the entire track assembly 56 may oscillate about the axis of axle member 46. Final drive assembly 58 is mounted on casing 26, which houses a bevel gear drive for the transfer of power through final drive assembly 58 to drive sprocket 59.

In a similar manner, a final drive assembly 62, incorporating a drive sprocket 63, is mounted to casing 40, which houses a bevel gear drive. An endless track assembly 60 encompasses drive sprocket 63 and a roller frame on which idlers are mounted. The roller frame is pivotally mounted on shaft 48 so that the entire track assembly 60 may oscillate about the axis of axle member 48.

in the same manner, endless track assemblies 64, 66 are mounted on axle members 52, 54 respectively to be oscillatable about the respective axes (i.e., the axis of shaft 50) thereof.

It will be seen, additionally, that each track assembly is oscillatable about the axis of its associated axle member independently of oscillation of the other track assemblies. Such an independent oscillation system of track assemblies is disclosed in the co-pending application entitled "Triangular Track Resilient Bogey Suspension," Ser. No. 212,396, filed Dec. 27, 1971 and assigned to the assignee of this application.

Fixed to and downwardly extending from frame 12 above casings 26, 40 is extended frame portion 12a, comprising spaced plates 68, 70. A rigid equalizer bar 72 is pivotally fixed at its midpoint between such spaced plates 68, 70 by means of a pin 74. The bar 72 extends downwardly from either side of the pin 74 and contacts the casings 26, 40 in sliding relationship therewith, with the ends thereof finally curving upward from the casings 26, 40 as shown in FIG. 3. The ends of bar 72 are retained is such sliding relationship by retaining members 76, 78. With such an arrangement, it will be seen that a degree of travel of the casings 26, 40, and thus the axle members 46, 48 relative to each other and to the frame 12, is allowed, through the pivoting of arm members 20, 34 about the respective pivot means 28, 42, the pivoting of equalizer bar 72 about pin 74, and the sliding relationship of the ends of the equalizer bar 72 with the casings 26, 40. The allowed motion of each axle member is, in fact, in a back and forth path generally toward and away from the general plane 18 of the frame 12. If, for example, the tractor 10 is rolled over rough terrain and axle member 46 is forced upward relative to the axle member 48, arm 20 will pivot upward, and equalizer bar 72 will pivot about pin 74 with the ends thereof sliding on casings 26, 40, allowing both track assemblies 56 and 60 to remain in contact with the ground. The equalizer bar 72, it will be seen, also provides the advantage that the load carried on each of the track assemblies 56, 60 is substantially equal, because the carried load is transferred through the extended ends of the equalizer bar 72, which will further aid in keeping the track assemblies 56, 60 in contact with the ground. This feature of allowing the arm members 20, 34 to pivot about an axis disposed across the frame 12 in combination with the free oscillation of each track assembly relative to the others about the axis of its associated axle member, further promotes continuous contact between the track assemblies and the ground.

As best shown in FIG. 2, two engines 80, 82 power the tractor 10. Each engine is mounted to the frame 12. Cooling for the engines 80, 82 is provided by radiator 84. Engine 80 is directly connected to a transmission 86 having a transmission output shaft 88. The shaft 88 is connected to a transfer gear box 90 having a dropped section providing output for two drive shafts 92, 94 so that equal torque is provided front and rear. Drive shaft 92 extends forwardly, through a universal joint connecting the transfer gear box 90 to the forward bevel gear drive assembly housed in casing 26. A carrier 96, providing a pair of bearings for supporting drive shaft 92, is mounted between bars 22, 24 to permit oscillation of the drive shaft 92.

Drive shaft 94 extends rearwardly from the transfer gear box 90 to a rear bevel gear drive assembly, and to a final drive assembly 98 to the track assembly 64.

It will be understood that the engine and drive train arrangement associated with engine 82 and track assemblies 60 and 66, is similar to that just described for engine 80 and track assemblies 56 and 64. Clutch and brake mechanisms (not shown) are housed within the bevel gear drive assemblies to provide steering control of the tractor 10, as is well known.

As mentioned previously, in the turning of the tractor 10 described herein by means of skid-steering, the front pair of track assemblies 56, 60, slide together in the same direction over the ground so that the resulting forces acting at ground level on said front pair act in the same direction. In the present tractor 10, there will be no tendency of the tractor 10 to rock, or to raise a track assembly 56, 60 off the ground from these forces, because these side loads on tracks 56, 60 are transferred into the frame 12 at the pivot pins 30, 32, 44 along lines which are substantially parallel to the front-rear axis of the tractor 10. As an example, if the tractor 10 is being turned to the left, the resulting ground forces on track assemblies 56 and 60 act directly along arm members 20 and 34, so that the forces placed on the frame 12 by the sideward sliding are along those arm members. such forces, it will be understood, do not have any tendency to lift one part of the tractor 10 relative to another part, so that the track assemblies 56, 60 can properly remain in contact with the ground. In addition, the load equalizing bar 72 insures that the load carried by the track assemblies 56, 60 is distributed substantially equally therebetween.

Such advantages are provided by means which are simple in design and which operate in an efficient manner. Such a tractor 10 permits a stable controlled placement of the operator station for improved control and visibility, thereby contributing significantly to increased safety and productivity.

What is claimed is:

1. A powered crawler tractor comprising: a rigid frame defining a pair of end portions; first and second axle members disposed on either side of one end portion; third and fourth axle members disposed on either side of the other end portion; four endless track assemblies, one track assembly being mounted on each of said axle members; means for allowing a degree of travel of the first and second axle members relative to each other and to the frame, in a back and forth path generally toward and away from the general plane of the frame; means for driving each of said four track assemblies; and wherein said means for allowing said degree of travel comprise a first elongated arm member and first pivot means connecting one end of the first elongated arm member and the frame, the other end of the first elongated arm member having said first axle member fixed thereto, and a second elongated arm member and second pivot means connecting one end of the second elongated arm member and the frame the other end of the second elongated arm member having said second axle member fixed thereto.

2. A powered crawler tractor according to claim 1 wherein said first and second pivot means are positioned substantially intermediate the one and other end portions of the frame.

3. A powered crawler tractor according to claim 2 wherein the first and second pivot means are positioned to provide pivoting of the first and second elongated arm members about an axis disposed across the frame from one side to the other.

4. A powered crawler tractor comprising:
a. a rigid frame defining a forward portion and a rearward portion;
b. first and second elongated arm members pivotally attached to the frame substantially intermediate the forward and rearward portions of the frame and extending toward the forward portion of the frame, and pivotable about an axis disposed across the frame from one side thereof to the other;
c. first and second axle members fixed to the extended ends of the first and second elongated arm members respectively;
d. third and fourth axle members disposed on either side of the rearward portion of the frame;
e. four endless track assemblies, one track assembly being mounted on each of said axle members;
f. load equalizing means interconnecting the extended ends of the elongated arm members and the forward portion of the frame for providing that the load of the forward end portion is carries substantially equally by the endless track assemblies mounted on the first and second axle members; and,
g. means for driving each of said four track assemblies.

* * * * *